US010275937B2

(12) United States Patent
Chien et al.

(10) Patent No.: US 10,275,937 B2
(45) Date of Patent: Apr. 30, 2019

(54) INDIRECT ILLUMINATION METHOD AND 3D GRAPHICS PROCESSING DEVICE

(71) Applicants: National Taiwan University, Taipei (TW); MEDIATEK INC., Hsin-Chu (TW)

(72) Inventors: Shao-Yi Chien, Taipei (TW); Yen-Yu Chen, Tainan (TW)

(73) Assignees: National Taiwan University, Taipei, Taiwan (CN); MEDIATEK INC., hsin-Chu, Taiwan (CN)

( * ) Notice: Subject to any disclaimer, the term of this patent is extended or adjusted under 35 U.S.C. 154(b) by 0 days.

(21) Appl. No.: 15/588,723

(22) Filed: May 8, 2017

(65) Prior Publication Data
US 2017/0323474 A1    Nov. 9, 2017

Related U.S. Application Data

(60) Provisional application No. 62/332,483, filed on May 6, 2016.

(51) Int. Cl.
G06T 15/50 (2011.01)
G06T 19/00 (2011.01)

(52) U.S. Cl.
CPC .......... G06T 15/506 (2013.01); G06T 19/006 (2013.01)

(58) Field of Classification Search
CPC .......... G06T 15/08; G06T 15/06; G06T 15/50
See application file for complete search history.

(56) References Cited

U.S. PATENT DOCUMENTS

2011/0115787 A1* 5/2011 Kadlec ................ G01V 1/345
                                                      345/419
2013/0033507 A1  2/2013 Garanzha
2015/0262416 A1* 9/2015 Hecht ................ G06T 17/005
                                                      345/424

FOREIGN PATENT DOCUMENTS

TW         201234261 A1     8/2012

OTHER PUBLICATIONS

Thiedemann et al., Voxel-based Global Illumination, I3D 2011, Feb. 18-20, 2011, pp. 103-110.*
Whelan et al., ElasticFusion: Real-time dense SLAM and light source estimation, The International Journal of Robotics Research, 2016, vol. 35(14), pp. 1697-1716.*

* cited by examiner

*Primary Examiner* — Haixia Du
(74) *Attorney, Agent, or Firm* — Winston Hsu

(57) ABSTRACT

The present invention provides a method of indirect illumination, for a 3D graphics processing device, including obtaining a scene and perform a voxelization to the scene; performing a lighting computation to the voxelized scene from a plurality of light sources, and store a potential lighting driven voxel (pLDV) list according to the lighting computation; sorting the pLDV list to generate a sorted pLDV list; and performing a compaction process to the sorted pLDV list; wherein each voxel in the pLDV list stores a reflective radiance and a Morton code corresponding to each voxel.

6 Claims, 10 Drawing Sheets

INDIRECT ILLUMINATION METHOD AND 3D GRAPHICS PROCESSING DEVICE

CROSS REFERENCE TO RELATED APPLICATIONS

This application claims the benefit of U.S. Provisional Application No. 62/332,483 filed on 2016 May 6, the contents of which are incorporated herein in their entirety.

BACKGROUND OF THE INVENTION

1. Field of the Invention

The present invention relates to an indirect illumination processing method and a 3D graphics processing device, and more specifically, to an indirect illumination method and a 3D graphics processing device for processing a scene according to a lighting-driven voxel for indirect illumination.

2. Description of the Prior Art

Because of the popularity about the virtual reality devices, the demand for video quality increases rapidly. People nowadays require images with high resolution and efficient memory usage. However, 3D rendering algorithms of the prior art cannot satisfy the requirements of high resolution and efficient memory usage at the same time. Therefore, it is necessary to improve the prior art.

SUMMARY OF THE INVENTION

It is therefore a primary objective of the present invention to provide an indirect illumination method and a 3D graphics processing device, capable of rendering scenes with high-resolution voxels and efficient memory usage, to improve over disadvantages of the prior art.

An embodiment of the present invention discloses a method of indirect illumination, for a 3D graphics processing device, comprising obtaining a scene and perform a voxelization to the scene; performing a lighting computation to the voxelized scene from a plurality of light sources, and store a potential lighting driven voxel (pLDV) list according to the lighting computation; sorting the pLDV list to generate a sorted pLDV list; and performing a compaction process to the sorted pLDV list; wherein each voxel in the pLDV list stores a reflective radiance and a Morton code corresponding to each voxel.

An embodiment of the present invention further discloses a 3D graphics processing device, comprising a processing unit; and a storage unit for storing a program code to instruct the processing unit to perform the following steps obtaining a scene and perform a voxelization to the scene; performing a lighting computation to the voxelized scene from a plurality of light sources, and store a potential lighting driven voxel (pLDV) list according to the lighting computation; sorting the pLDV list to generate a sorted pLDV list; and performing a compaction process to the sorted pLDV list; wherein each voxel in the pLDV list stores a reflective radiance and a Morton code corresponding to each voxel.

These and other objectives of the present invention will no doubt become obvious to those of ordinary skill in the art after reading the following detailed description of the preferred embodiment that is illustrated in the various figures and drawings.

DETAILED DESCRIPTION

Recently, several voxel-based global illumination algorithms rely on the use of reflective shadow maps (RSMs) for interactive computation of indirect illumination. However, they do not scale well with the number of light sources on account of the high memory consumption when rendering. Observing that, in most cases, only a fraction of voxels really contribute to single-bounce indirect illumination, in the present invention discloses a method of lighting-driven voxels (LDVs), constructed from a subset of voxels, to relief the burden of memory. The method of the present invention is used in conjunction with a voxel-based global illumination algorithm enabling interactive indirect illumination of dynamics scenes. The memory usage, query performance, and construction speed under various voxel resolutions are evaluated. Empirically, rendering using LDVs consumes an order of magnitude less memory than the RSMs and provides a higher performance on the radiance query when multiple light sources are used. Moreover, this invention integrates the present method to voxel ray tracing and voxel cone tracing. For each of them, interactive performance with significant memory reduction is achieved with respect to the prior art.

Global illumination (GI) effects add visual realism to the rendered images that are perceptually important for interactive applications, such as video games and virtual reality systems. Most of illumination energy comes from the single-bounce indirect illumination which provides plausible lighting even in visually demanding applications [1]. Recently, many GI algorithms rely on voxels to compute the indirect illumination in order to leverage the power of GPUs, because voxels are suitable for GPU implementation and achieve a degree of scene independence. To maintain high rendering performance, several approaches, such as [2] and [3], adopt reflective shadow maps (RSMs) to facilitate interactive computation of indirect illumination. However, they do not scale well with the number of light sources. Creating RSMs for all light sources imposes a heavy burden on memory usage and degrades the rendering performance due to a larger memory footprint.

Figure 1:
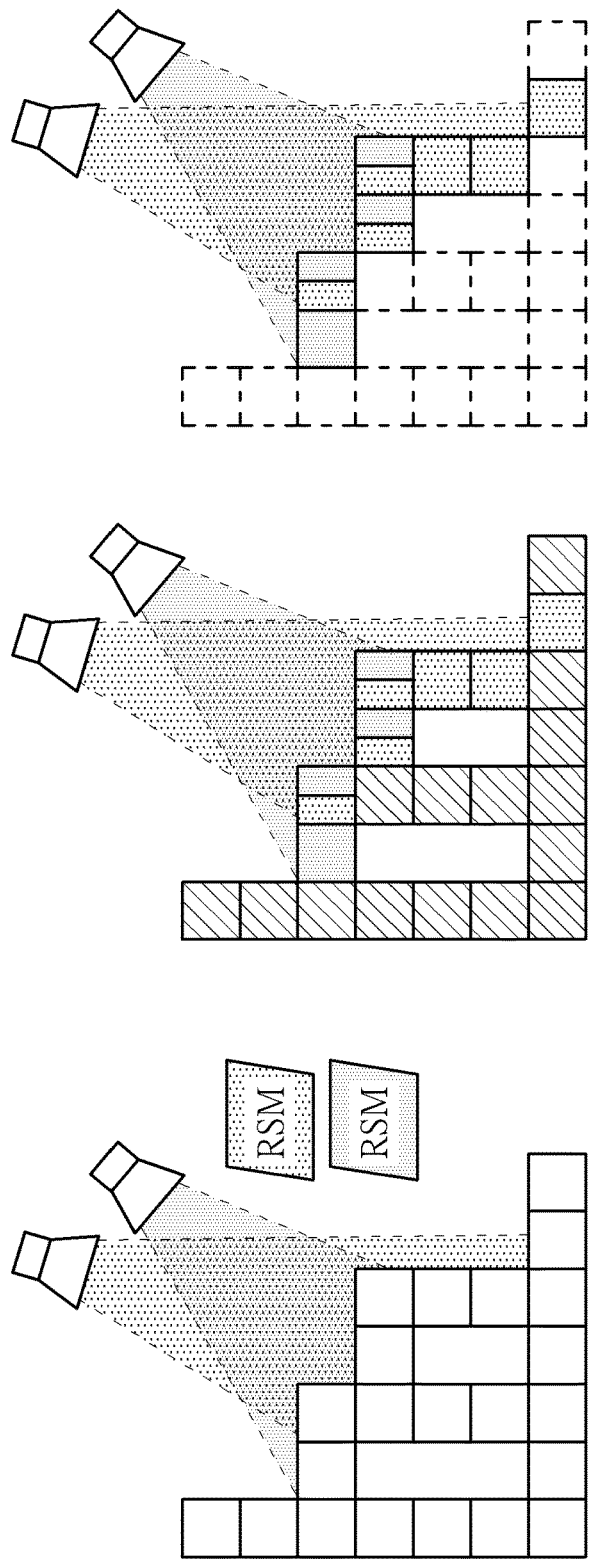
FIG. 1 is a schematic diagram of a Lighting-driven Voxel according to an embodiment of the present invention.

In this paper, the method of the present invention introduces lighting-driven voxels (LDVs) to reduce the memory consumption when querying the reflected radiance, generated by multiple light sources, for a voxel-based representation of the scene. Instead of storing the radiance in all generated voxels in a traditional way, the method only retain those ones that really contribute to the indirect illumination and manage them in a compact list. FIG. 1 illustrates the difference between the RSM, traditional approach, and our method. In summary, the contributions include:

A memory-efficient representation of the reflect radiance—lighting-driven voxel—to reduce the memory consumption for the computation of single-bounce indirect illumination.
A comprehensive evaluation of the LDV in terms of memory usage, query performance, and construction speed.
Integrating the proposed LDV into voxel ray tracing and voxel cone tracing algorithms which achieve interactive frame rates with very small memory footprint.

The remainder of this paper is organized as follows. The related works are reviewed in Section 2 and the method of the present invention, LDV, is described in Section 3. The integration of the LDV with the voxel-based algorithm is presented in Section 4. A comprehensive evaluation of the LDV is provided in Section 5, followed by the experimental results shown in Section 6. Finally, the present invention is concluded in Section 7.

A lot of effort has been put into developing GI solutions that can operate at interactive or even real-time speeds. In this section, the methods that are most relevant to the present invention are focused.

Reflective shadow maps (RSMs) capture lit surfaces by drawing the scene from the view of the light source that contain reflected radiance, position, and normal for each pixel. Each pixel is treated as a virtual point light (VPL) and used as the secondary light source for computing indirect lighting. The single-bounce indirect illumination can be efficiently obtained by gathering the radiance stored in VPLs. In addition to gathering, the shooting approach is later proposed in to render glossy reflections and simple caustics by appropriately elongating the splat size. Traditional RSM-based approaches suffer from a performance issue due to severe overdrawing. A hierarchical approach is proposed to consistently render small splats to buffers at different resolutions, upscale multiresolution buffers, and merge them to obtain the final image. Furthermore, the concept of hierarchical patch selection is employed to the RSM to reduce temporal incoherence.

Considering the visibility between VPLs and shading points adds realism to the rendered images. Imperfect shadow maps (ISMS) is introduced to approximate the visibility between VPLs and shading points. The main restriction of the ISM is the use of limited number of pre-computed point samples, which cannot capture finer details while rendering large scale scenes. However, this restriction is then lifted in the follow-up work. The issue of temporal incoherence for VPL lighting is addressed, which selects important VPLs based on Metropolis-Hastings sampling.

Recently, many GI algorithms, based on voxels, leverage the power of GPU that achieve interactive or real-time rendering performance. A method of diffusion scheme is proposed to propagate illumination energy, which is initialized from the RSM, encoded as low-order spherical harmonics, and injected to voxels, inside a uniform voxel grid. A view-dependent variant is then proposed by using a set of nested grids moving with the camera. An efficient ray-voxel intersection test is introduced to accelerate ray tracing on binary voxels. When an intersected voxel is found, the reflected radiance is retrieved from the RSM to compute indirect illumination. The method (VGI) reaches real-time performance but targets on only diffuse materials. Voxel cone tracing is developed to perform final gathering by tracing a few cones to a hierarchical representation of the scene. Each cone accumulates and blends the radiance stored in the voxel that it visits in each hierarchy level. A sparse voxel octree (SVO) is usually adopted to reduce the memory consumption for high-resolution voxels. To further relieve the burden of memory for VCT, The lighting data from occlusion data is decoupled and encode it in a layered reflective shadow map (LRSM). To compress the memory usage of the occlusion data, a sparse voxel directed acyclic graph (DAG) is proposed which allows nodes of the SVO to share pointers to identical subtrees.

Several voxel-based GI algorithms use the RSM to store the lighting data, i.e., reflected radiance, from the light source on account of its bounded memory consumption and high rendering performance. However, those algorithms do not scale well with the number of light sources. Computing several RSMs per frame imposes a heavy burden on memory usage and consequently decreases the rendering performance caused by a larger memory footprint. Storing reflected radiance in all generated voxels also consumes a large amount of memory when a high voxel resolution is required for computing detailed indirect illumination, such as indirect glossy reflections.

The goal of the present invention is to reduce the memory consumption for the computation of single-bounce indirect illumination in scenes with multiple light sources. Realizing that not all voxels are required for the computation of indirect illumination, the present invention proposes the use of lighting-driven voxels. LDVs are a subset of voxels during voxelization that are neither in shadowed, i.e., lit voxels, nor back facing to the camera. Empirically, the ratio of the number of LDVs to the number of generated voxels, referred as effectiveness rate, is usually small for architectural scenes (see Table 1). In the following subsections, we will describe the creation of the LDVs and querying of the LDV in our GPU implementation.

TABLE 1

Figure 2:
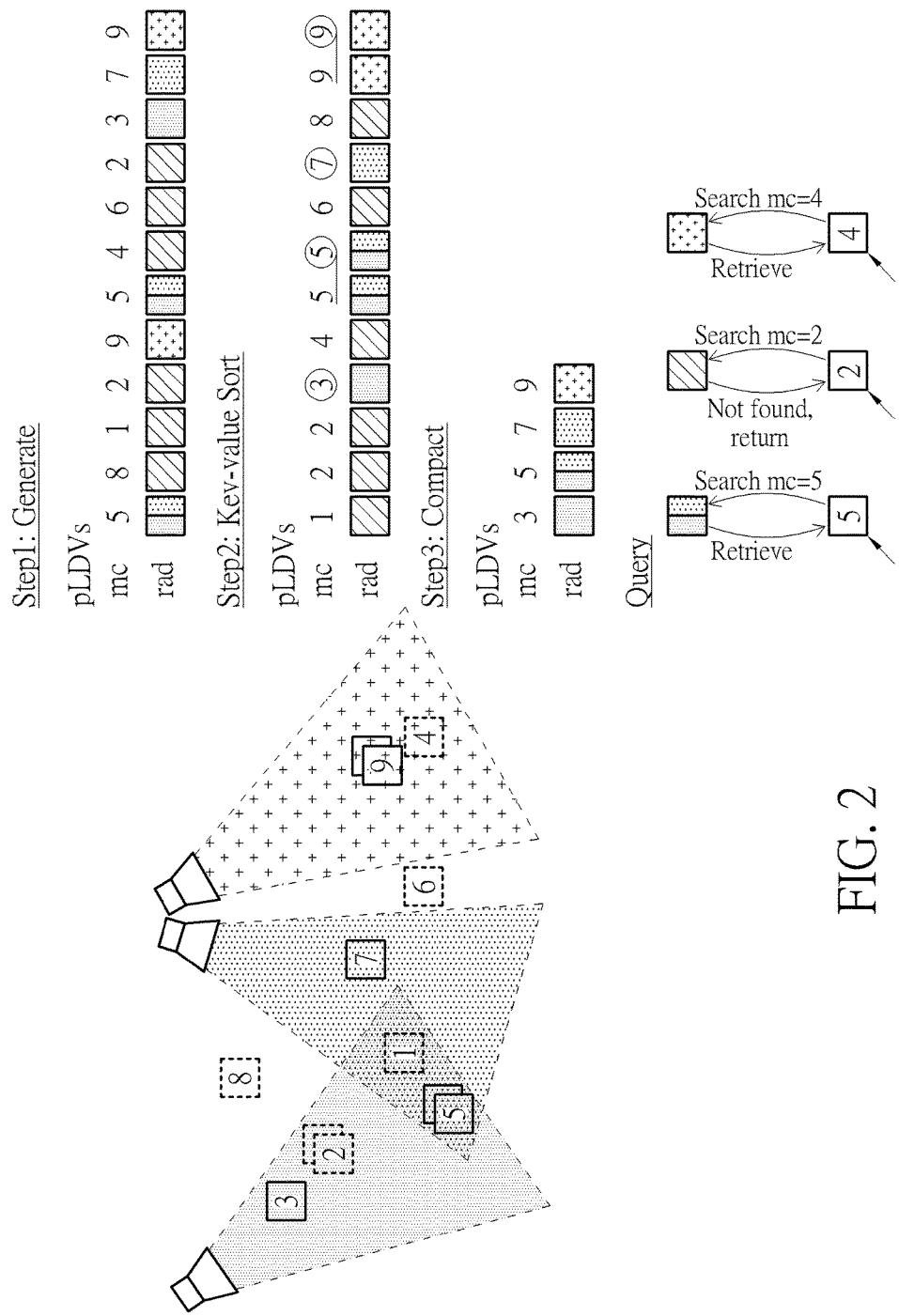
FIG. 2 is a schematic diagram of a Lighting-driven Voxel according to an embodiment of the present invention.
Figure 3:
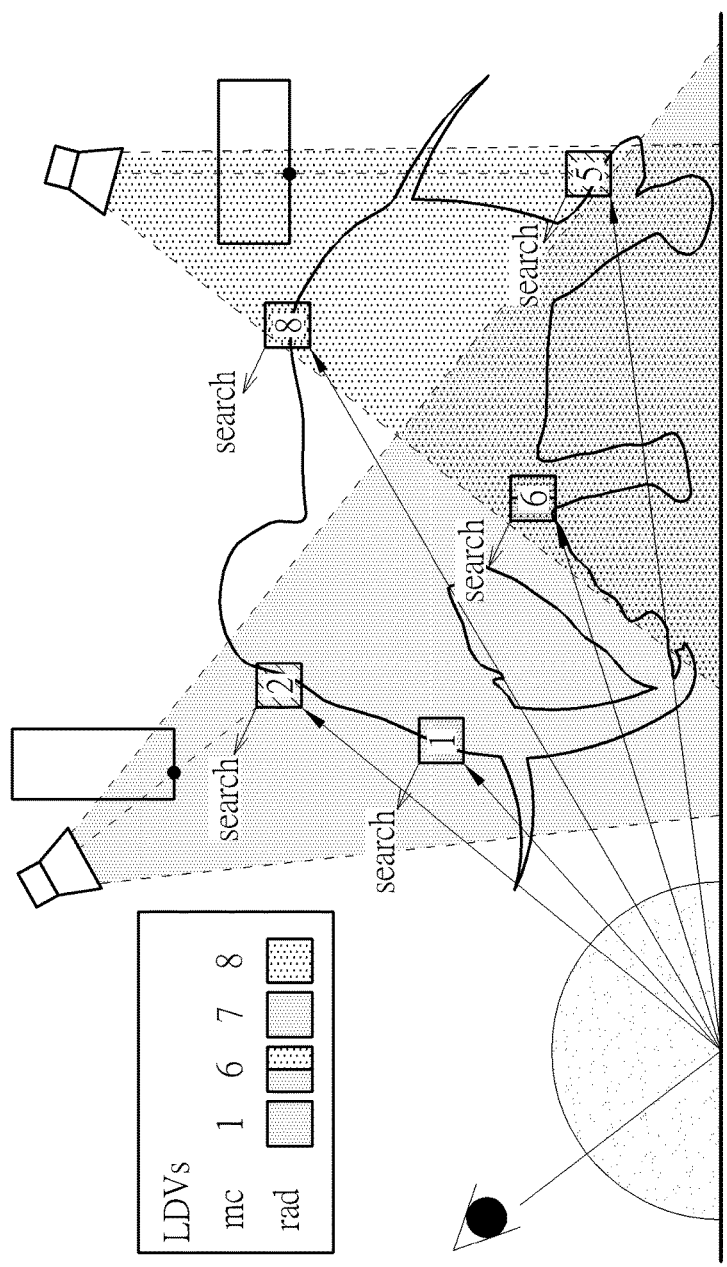
FIG. 3 is a schematic diagram of a Lighting-driven Voxel according to an embodiment of the present invention.

| | Sponza | | | | Sibenik | | | |
|---|---|---|---|---|---|---|---|---|
| | Voxel | Effectiveness (%) | LDV (MB) | RSM (MB) | Voxel | Effectiveness (%) | LDV(MB) | RSM (MB) |
| $128^3$ | 111K | 10.5 | 0.14 | 12.6 × 12 | 71K | 30.8 | 0.26 | 12.6 × 6 |
| $256^3$ | 524K | 8.5 | 0.53 | 12.6 × 12 | 284K | 28.5 | 0.97 | 12.6 × 6 |
| $512^3$ | 2.2M | 8.1 | 2.11 | 12.6 × 12 | 1.1M | 27.5 | 3.71 | 12.6 × 6 |
| $1K^3$ | 9.2M | 7.3 | 8.06 | 12.6 × 12 | 4.5M | 26.7 | 14.3 | 12.6 × 6 | details while rendering large scale scenes. However, this restriction is then lifted in the follow-up work. The issue of The process of creating LDVs is shown in FIG. 2. First, the scene is voxelized, and the lighting computation is performed on each generated voxel. The reflected radiance of the voxel and its Morton code are outputted in the fragment shader which forma potential LDV, denoted as pLDV, and all of them are stored in a pLDV list Then, the pLDV list is sorted in a Morton order as the case shown in the middle of FIG. 2 Because the voxel may be overlapped by more than one primitive, several pLDVs containing the same Morton code can be merged together to save the memory. A compaction process is performed on the pLDV list and each pLDV is launched for one thread. For each thread, if the Morton code of the neighboring pLDV on the right-hand side, i.e., direction in ascending order, equals to itself or its reflected radiance is black, it is terminated immediately. Otherwise, an LDV is constructed with the reflected radiance generated by blending those of pLDVs with the same Morton code on its left-hand side, i.e., direction in descending order, as the blue line depicted in FIG. 2.

In order to query the LDV with a simple binary search algorithm, sorting the LDV list in advance is performed. Because the number of LDVs becomes very small after the compaction, the overhead of sorting is small and amortized to all LDV queries. To obtain the desired LDV, the Morton code of the interested point in the scene is computed and searched for the corresponding LDV which carries the same Morton code, as depicted in FIG. 2. Once an LDV is found, its reflected radiance is obtained. Otherwise, the black color will be return.

Figure 9:
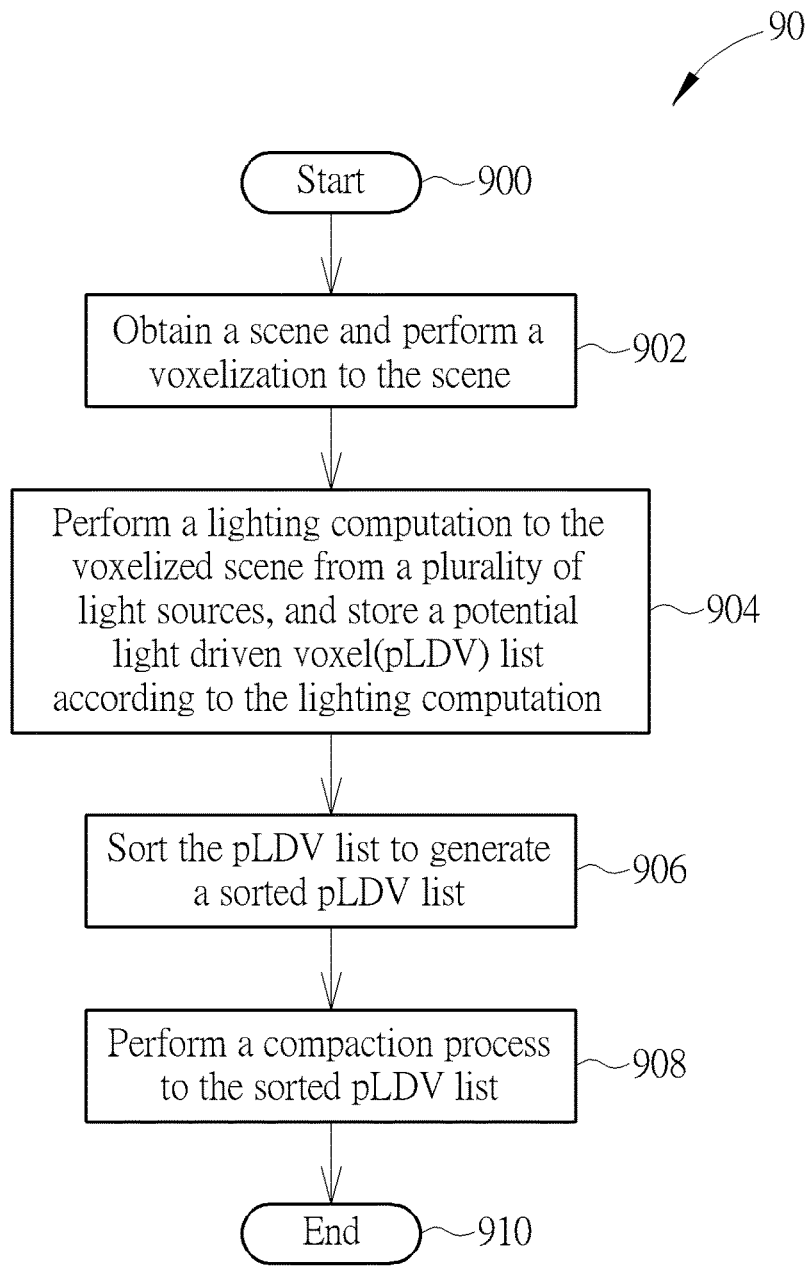
FIG. 9 is a schematic diagram of a process according to an embodiment of the present invention.
Figure 10:
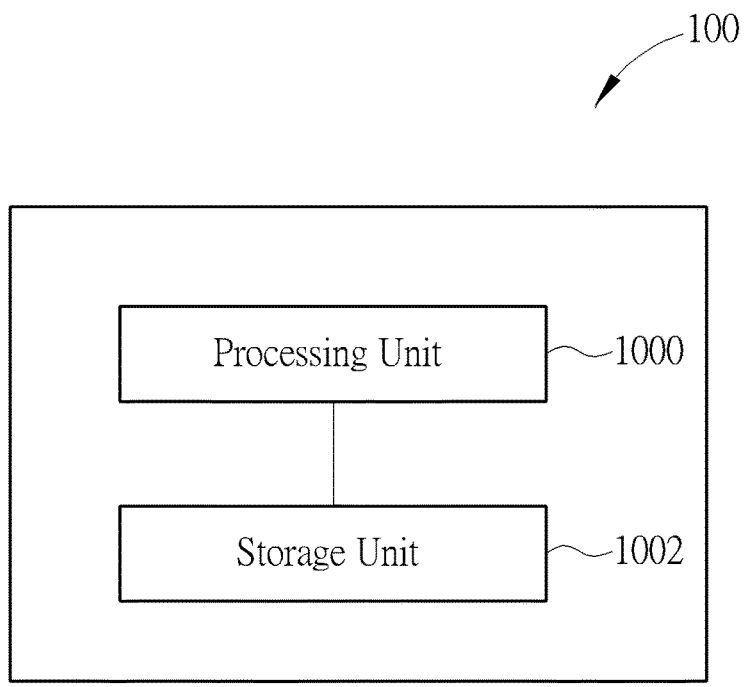
FIG. 10 is a schematic diagram of a 3D graphics processing device according to an embodiment of the present invention.

The operations of the present invention may be summarized into a process 90 as shown in FIG. 9. The process 90 comprises the following steps:
Step 900: Start.
Step 902: Obtain a scene and perform a voxelization to the scene.
Step 904: Perform a lighting computation to the voxelized scene from a plurality of light sources, and store a potential lighting driven voxel (pLDV) list according to the lighting computation.
Step 906: Sort the pLDV list to generate a sorted pLDV list.
Step 908: Perform a compaction process to the sorted pLDV list.
Step 910: End FIG. 10 further illustrates a 3D graphics processing device 100 according to an embodiment of the present invention. The image processing device 100 comprises a processing unit 1000 and a storage unit 1002. The storage unit 1002 is configured to instruct the processing unit 1000 to execute the steps of the process 90, so as to realize the lighting-driven voxel algorithms of the present invention.

The method of the present invention can be applied to any voxel-based algorithm which needs to query the reflected radiance, generated from the light sources, at any given point. The present invention integrates it into two illumination models, which respectively adopt voxel ray tracing and voxel cone tracing to compute the outgoing radiance $L_o$ in direction $\omega_o$ at shading point x $$L_o(x,\omega_o) = \int_\Omega f(x,\omega_o,\omega_i) L_i(x,\omega_i)(n \cdot \omega_i) d\omega_i \tag{1}$$

where $f(x,\omega_o,\omega_i)$ is the bidirectional reflectance distribution function (BRDF) at the shading point x with incoming direction $\omega_i$ and outgoing direction $\omega_o$, $L_i$ is the incoming radiance, and n is surface normal at point x.

To compute single-bounce indirect illumination, by adopting Monte-Carlo integration, Eq. 1 can be approximated as $$L_o(x,\omega_o) \approx \sum_{j=1}^{N} \frac{f(x,\omega_o,\omega_i)\hat{L}(x,\omega_j)(n \cdot \omega_j)}{p(\omega_j)}, \tag{2}$$

where $p(\omega_j)$ is the probability density function of N final gather rays in direction $\omega_j$, and $\hat{L}$ denotes the first-bounce reflected radiance from the light source. Based on the deferred shading, each deferred pixel is treated as a shading point. Several final gather rays are cast from each shading point to the voxel representation of the scene, and the center of the first occluded voxel is used as an approximated intersection. Instead of using the RSM to compute $\hat{L}$, the present invention proposes to construct the LDVs to determine it, as the rendering cost, including memory consumption and the speed of the radiance query, loosely depends on the number of light source.

Many researches have been proposed to provide high performance voxel ray tracing on GPUs. In the experiments, the present invention integrates the proposed LDV with the ray-voxel intersection test to demonstrate its efficiency in memory usage and query speed. Instead of using atlas-based voxelization, the GPU-based voxelization is applied to discretize the scene that can be used in combination with the creation of LDVs. When an intersected voxel is found, the search for the desired LDV containing the same Morton code as the intersected voxel and the retrieve of the reflected radiance for accumulation is performed. In order to reduce the rendering cost, only a few final gather rays are cast on each shading point, and then a geometry-aware filtering is applied on the rendered image to remove the noise.

From the point of view of cone tracing, the integral in Eq. 1 can be partitioned into M parts as $$L_o(x,\omega_o) \approx \Sigma_{j=1}^{M} \int_{\Omega_j} f(x,\omega_o,\omega_i) L_i(x,\omega_i)(n \cdot \omega_i) d\omega_i \tag{3}$$

Assuming the incoming radiance is the same inside the cone and only diffuse material is used in the scene, Eq. 3 becomes $$L_o(x,\omega_o) = \frac{\rho}{\pi} \sum_{j=1}^{M} L_j(x) \int_{\Omega_j} (n \cdot \omega_i) d\omega_i \tag{4}$$

where $W_j = \int_{\Omega_j}(n \cdot \omega_i) d\omega_i$ is the weighting function, and rho is the albedo of the surface. Each part corresponds to tracing a volumetric cone through a hierarchical representation of the scene. Lj is approximated by blending the radiance at several cone samples when stepping along the cone axis, as illustrated in FIG. 4.

Figure 4:
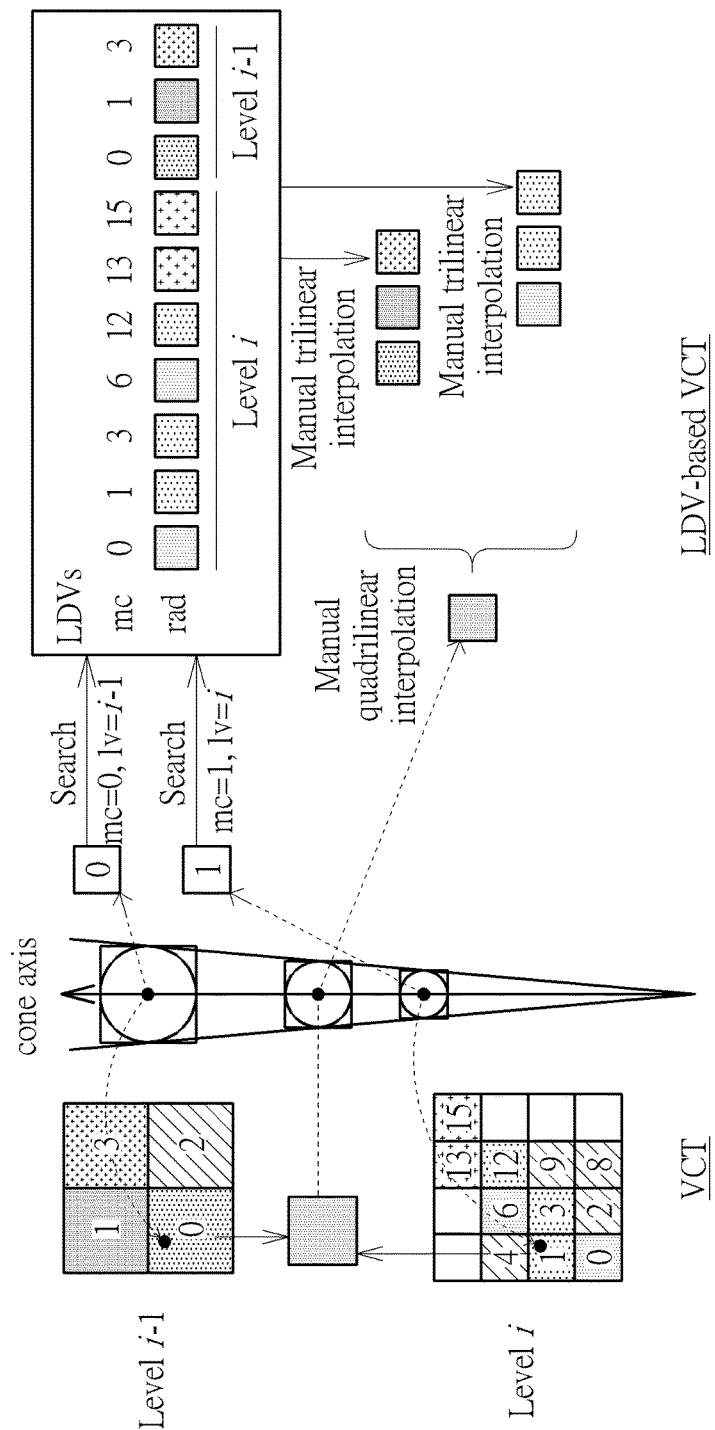
FIG. 4 is a schematic diagram of a Lighting-driven Voxel according to an embodiment of the present invention.

In a traditional solution like VCT, the reflected radiance is pre-filtered and stored in all voxels for each hierarchy level, as shown in the left part of FIG. 4. In our approach, the LDV lists are constructed for all hierarchy levels and connect all of them to one list. An auxiliary buffer, which stored the first index of the LDV in each hierarchy level, is used to avoid searching the entire list when querying the LDV. As a result, only the LDVs at the same hierarchy level as the querying one need to be evaluated. To determine the reflected radiance at a cone sample, 16 neighbor LDVs are retrieved, one half from the coarser level and one half from the finer level, to perform the interpolation manually, as shown in the right part of FIG. 4. Owing to the Morton order of the LDV list, these neighbor LDVs can be efficiently accessed.

In this section, the LDV of the present invention is evaluated in terms of memory consumption, query speed, construction speed, and rendering quality. The test scene is SPONZA with a galloping elephant illuminated by twelve spot lights, where ten of them are placed in front of each curtain at first floor, and the others are placed at the corners at second floor. All light sources are allowed to be moved when rendering the scene. The full sequence is recorded in the accompany video.

Figure 5:
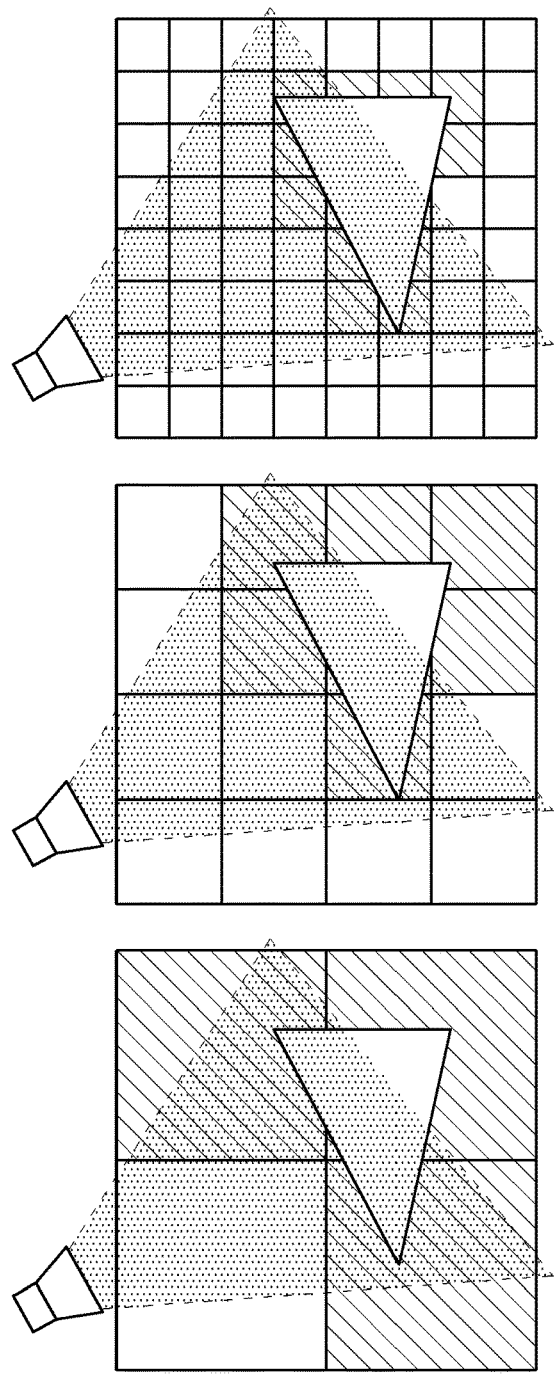
FIG. 5 is a schematic diagram of a Lighting-driven Voxel according to an embodiment of the present invention.

Table 1 shows the memory consumption of the rendering using LDVs and RSMs. It is evident that the effectiveness rate decreases as the voxel resolution increases. Because the high-resolution voxel provides finer granularity on the sampling of the scene, and thus a higher ratio of voxels are likely to be discarded during voxelization, as the case depicted in FIG. 5. In our experiment, less than 12% of voxels really contribute to the indirect illumination. In other words, more than 88% of memory can be saved when compared with the traditional approach, which stores the radiance data in a dense voxel grid. By adopting the compaction during the LDV creation, a large amount of pLDV can be merged together, reaching to an approximately reduction ratio of 90%, as shown in Table 2.

TABLE 2

| | Voxel Resolution | | | |
|---|---|---|---|---|
| | $128^3$ | $256^3$ | $512^3$ | $1K^3$ |
| # of pLDVs | 65.1K/103K | 123K/210K | 295K/538K | 859K/1.62M |
| # of LDVs | 11.7K/21.8K | 44.4K/81.1 | 176K/309K | 671K/1.19M |
| Reduction ratio | 82.1/78.9 | 63.9/61.3 | 40.5/42.6 | 21.9/26.7 |

Figure 6:
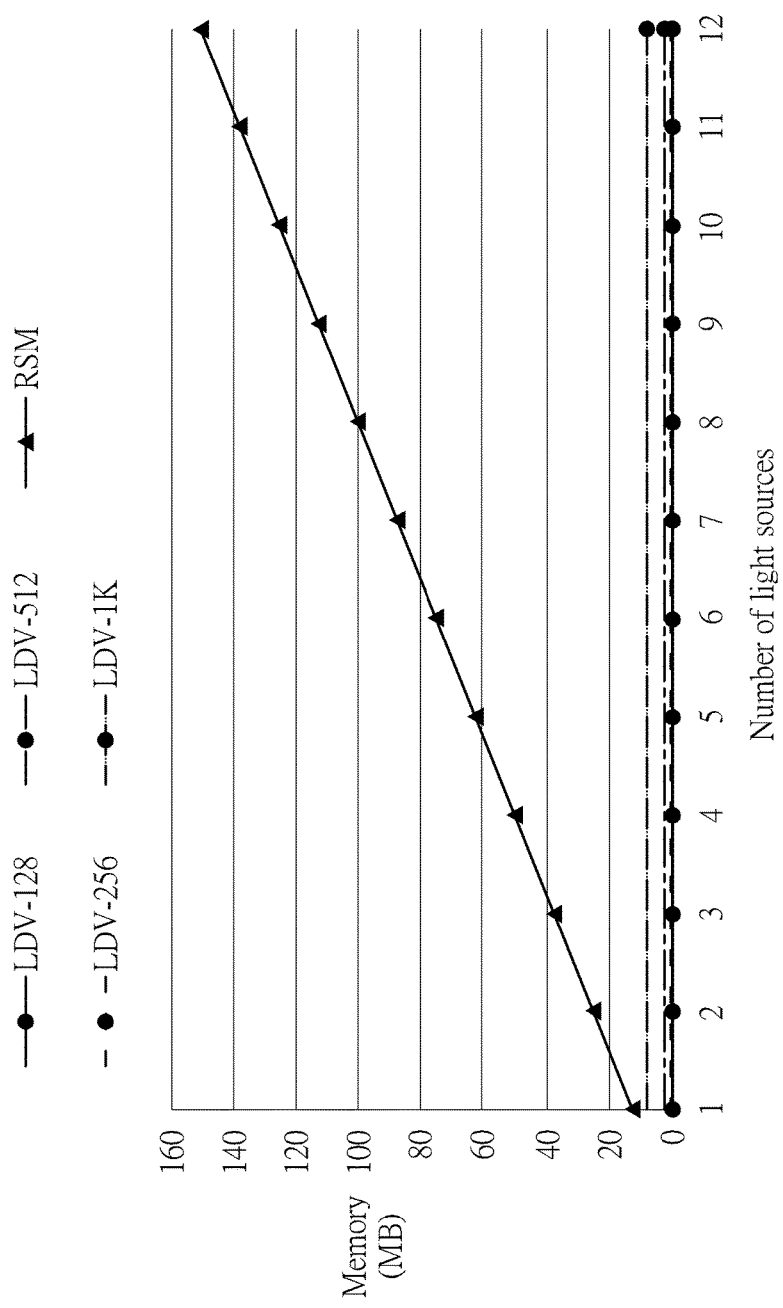
FIG. 6 is a schematic diagram of a memory chart according to an embodiment of the present invention.

Compared with the RSM, the LDV consumes only a small fraction of memory on account of its loose dependence with the number of light sources. Therefore, more light sources are added to the scene, more memory efficient our method is. As shown in FIG. 6, the method of the present invention outperforms the RSM in memory consumption for all cases. Taking the voxel resolution of $1K^3$ as an example, the present method of the present invention consumes an order of magnitude less memory than that of the RSM. The method of the present invention is also compared with the SVO that also achieves an order of magnitude more memory efficient, because a lot of voxels that are in shadowed are discarded in our method.

Figure 7:
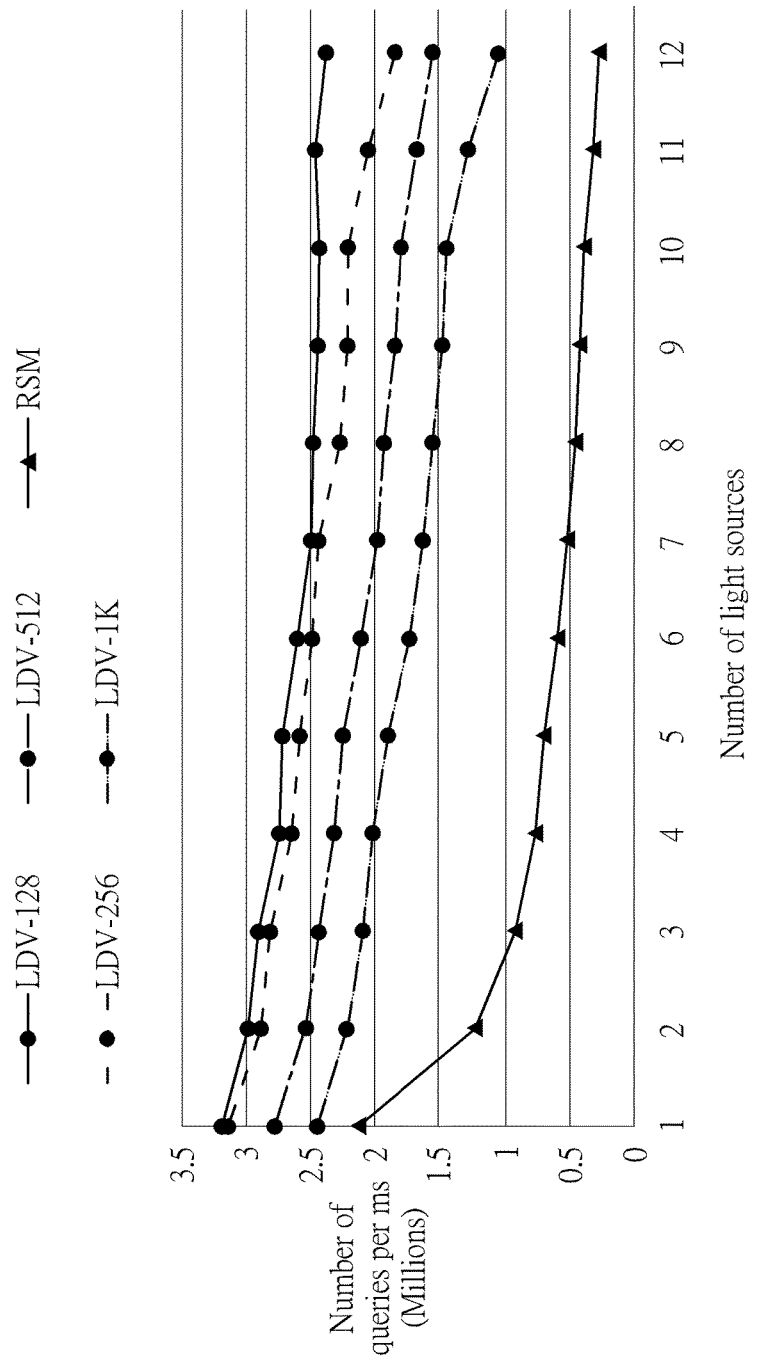
FIG. 7 is a schematic diagram of a query comparison chart according to an embodiment of the present invention.

FIG. 7 shows the performance of querying LDVs and RSMs when different numbers of light sources are used in SPONZA. They are measured by averaging the processing time of the radiance queries from 100K final gather rays on each shading point, i.e., deferred pixel.

For the LDV, the speed is dominated by the size of the LDV list on account of the binary searching process adopted in the algorithm. The size of the list is mainly determined by two factors: the voxel resolution and the number of light sources. Increasing the voxel resolution, of course, more lit voxels occur, and thus more LDVs will be constructed (Table 1). From the point of view of the number of light sources, when more light sources are added to the scene, fewer voxels are likely to be discarded when constructing LDVs, resulting in a longer LDV list. Nevertheless, the impact on rendering performance, caused by the incensement of the light sources, is small. Even if more than 10 light sources occur in the scene, our method still provides a throughput of over 1.5 million queries per millisecond at the voxel resolution of $512^3$. In terms of the RSM, the performance degrades as the number of light sources increases due to the enlarged memory footprint.

The time taken to creating LDVs is presented in Table 3. There is no doubt that more time is required for high-resolution voxels because more lighting computations are performed when generating pLDVs. The time for compaction, relatively, increases on account of the construction of a longer LDV list. Nevertheless, it requires less than 10 milliseconds for the scene at a voxel resolution of $512^3$, which is high enough for most interactive global illumination algorithms. We believe that our method can be integrated into many voxel-based algorithms with little overhead. For example, in Table 4, it shows that the construction time of LDVs is relatively smaller than that of the RSM which enables real-time rendering with single-bounce indirect illumination effects.

TABLE 3

| | Voxel Resolution | | | |
|---|---|---|---|---|
| | $128^3$ | $256^3$ | $512^3$ | $1K^3$ |
| Generate | 2.7/0.5 | 2.7/0.5 | 3.4/0.6 | 6.1/1.0 |
| Sort | 1.8/1.7 | 2.2/1.9 | 2.8/3.0 | 5.4/6.7 |
| Compact | 0.8/0.7 | 0.9/0.7 | 1.2/1.2 | 2.7/3.4 |
| Total | 5.3/2.9 | 5.8/3.1 | 7.4/4.8 | 14.2/11.1 |

Figure 8:
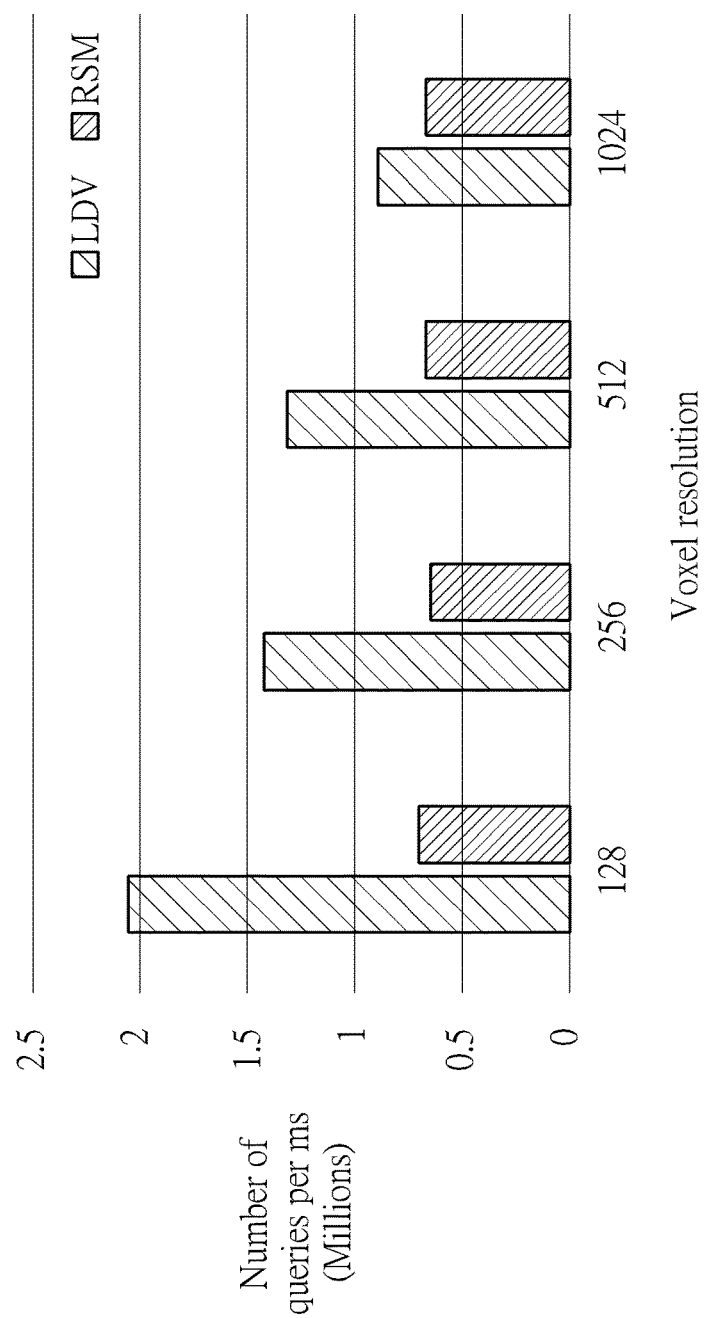
FIG. 8 is a schematic diagram of a speed comparison chart according to an embodiment of the present invention.

Detailed indirect illumination such as indirect highly glossy reflections can be achieved by adopting high-resolution voxels, such as $512^3$. In this case, when querying the radiance from the RSM, the inequality, used to decide whether to retrieve the radiance from the RSM, is prone to be dominated by the size of the re-projected RSM pixel at the query point, as depicted in FIG. 8. This situation is similar to the perspective aliasing in shadow mapping. The mapping of the voxel to the RSM pixel is not always a one-to-one ratio, resulting in incorrect radiance gathering, as shown in FIG. 8. With the proposed LDVs, the artifact can be removed by using the radiance data stored in the voxel.

In this section, a demonstration of the rendering performance of the LDV when it is relatively integrated into the voxel ray tracing and voxel cone tracing is performed. Unless mentioned otherwise, all images are rendered with single-bounce indirect illumination at a resolution of 800× 500 on a PC with an Intel i7 CPU and an NVIDIA GTX 980 graphics card. The direct illumination is computed separately by utilizing deferred shading [21].

SPONZA is taken as the test scene to demonstrate the rendering of voxel ray tracing with LDVs. For comparison, VGI based on efficient ray is implemented. Instead of using atlases, we adopted the GPU-based voxelization to generate the voxel representation of the scene and encoded binary voxels in the 2D texture. When rendering, 10 rays were cast on each shading point to gather the single-bounce indirect radiance. Instead of querying the RSM as VGI does, we retrieve the reflected radiance by searching the desired LDV.

The rendered result of our approach is shown in the left part of FIG. 9. All scene components can be fully dynamic, including geometries, materials, and light sources. Table 4 shows the timings of the method of the present invention and VGI. The present invention outperforms VGI owing to a faster speed on radiance query. Moreover, the overhead of constructing LDVs is smaller than that of the RSM. In terms of memory usage, our approach consumes only a fraction of memory, which is an order of magnitude smaller than VGI.

TABLE 4

|  | LDV | VGI |
|---|---|---|
| Create LDVs/RSMs (ms) | 5.3 | 27 |
| Intersection (ms) | 8.2 | 8.2 |
| Radiance query (ms) | 1.7 | 17.7 |
| Performance (fps) | 34 | 16 |
| Memory (MB) | 0.14 | 151 |

In terms of voxel cone tracing, SIBENIK is used as the test scene, as shown in the right part of FIG. 9. The scene is illuminated by a point light placed above the stage. All scene geometries are set as glossy reflective. For comparison, the voxel cone tracing based on view dependent variant was implemented without an SVO construction. The reflected radiance is stored in a dense voxel grid, i.e., a large 3D texture, and then mipmapped with isotropic filtering.

As shown in Table 5, it can be seen that the present invention achieves approximately 98% of memory reduction with respect to VCT. For a voxel resolution of $512^3$, it requires less than 6 MB for storing the radiance data, where VCT consumes over 1.6 GB. In terms of rendering speed, the present invention is slower than VCT due to the computational cost of manual interpolations between mipmap levels and among voxels. When the voxel resolution increases, our method takes more time for tracing cones owing to the longer LVD list. The increment of timing cost for the specular cone is larger than that of the diffuse cone, because more cone samples are needed to be evaluated before stepping out of the scene. Nevertheless, our approach still achieves interactive speeds at all voxel resolutions.

TABLE 5

|  | LDV | | | | VCT | | |
|---|---|---|---|---|---|---|---|
|  | Diffuse (ms) | Specular (ms) | Build (ms) | Memory (MB) | Diffuse (ms) | Specular (ms) | Memory (MB) |
| $128^3$ | 9.5/4.5 | 30.0/8.2 | 28.3/32.9 | 0.4/11.9 | 1.0 | 1.8 | 25.2 (2.7) |
| $256^3$ | 19.2/6.4 | 42.5/12.2 | 75.8/94.0 | 1.5/46.2 | 1.5 | 2.8 | 201.3 (11.8) |
| $512^3$ | 29.0/8.5 | 54.6/16.7 | 256.2/336.0 | 5.6/176.4 | 1.9 | 4.1 | 1610.6 (49.9) |

In this present invention, a method is disclosed to manage the first-bounce reflected radiance, from multiple light sources, in a memory efficient way. The key ingredient to it is lighting-driven voxels, a small subset of voxels, which really contributes to the computation of indirect illumination. A comprehensive evaluation reveals that querying LDVs achieves higher performance than querying RSMs on account of a smaller memory footprint, especially for scenes with multiple light sources. In addition, this invention also demonstrates the integration of the LDV with voxel ray tracing and voxel cone tracing algorithms that achieve interactive frame rates while consuming only a small amount of memory.

In the future, the precaution of the manual interpolation when evaluating the cone sample in voxel cone tracing is in progress. It can be achieved possibly by injecting the radiance data of the LDV to the voxel volume stored in texture memory and leveraging the hardware filtering.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of indirect illumination, for a 3D graphics processing device, comprising:
   obtaining a scene and perform a voxelization to the scene;
   performing a lighting computation to the voxelized scene from a plurality of light sources, and storing a potential lighting driven voxel (pLDV) list according to the lighting computation, wherein the lighting computation is to generate a pLDV each time a voxel is irradiated by a light source, and store all the pLDVs as the pLDV list, and each pLDV stores a Morton code corresponding to the voxel and a reflected radiance corresponding to the light source;
   sorting the pLDV list to generate a sorted pLDV list;
   performing a compaction process to the sorted pLDV list; and
   generating an image according to the pLDVs of the pLDV list resulted from the compaction process.

2. The method of claim 1, wherein sorting the pLDV list to generate the sorted pLDV list is to sort the pLDV list according the Morton code stored in the pLDV list and generating the sorted pLDV list.

3. The method of claim 1, wherein the compaction process is to compare the Morton code of each voxel in the sorted pLDV list, and terminate the voxel at an ascending order when two adjacent voxels have the same Morton code or terminate the voxels with black reflective radiance.

4. A 3D graphics processing device, comprising:
   a processing unit; and
   a storage unit for storing a program code to instruct the processing unit to perform the following steps:
      obtaining a scene and perform a voxelization to the scene;
      performing a lighting computation to the voxelized scene from a plurality of light sources, and storing a potential lighting driven voxel (pLDV) list according to the lighting computation;
      generating a pLDV each time a voxel is irradiated by a light source, and storing all the pLDVs as the pLDV list, wherein each pLDV stores a Morton code corresponding to the voxel and a reflected radiance corresponding to the light source;
      sorting the pLDV list to generate a sorted pLDV list;
      performing a compaction process to the sorted pLDV list; and
      generating an image according to the pLDVs of the pLDV list resulted from the compaction process.

5. The 3D graphics processing device of claim 4, wherein the storage unit further instructs the processing unit to perform the following steps, for to generating the sorted pLDV list:
   sorting the pLDV list according the Morton code stored in the pLDV list and generating the sorted pLDV list.

6. The 3D graphics processing device of claim 4, wherein the storage unit further instructs the processing unit to perform the following steps, for performing a compaction process:

comparing the Morton code of each voxel in the sorted pLDV list, and terminate the voxel at an ascending order when two adjacent voxels have the same Morton code or terminate the voxels with black reflective radiance.

* * * * *

UNITED STATES PATENT AND TRADEMARK OFFICE
CERTIFICATE OF CORRECTION

PATENT NO. : 10,275,937 B2
APPLICATION NO. : 15/588723
DATED : April 30, 2019
INVENTOR(S) : Shao-Yi Chien et al.

It is certified that error appears in the above-identified patent and that said Letters Patent is hereby corrected as shown below:

On the Title Page

Item (73), correct the country of the 1st assignee from "Taipei, Taiwan (CN)" to --Taipei (TW)--;
Correct the country of the 2nd assignee from "Hsin-Chu, Taiwan (CN)" to --Hsin-Chu (TW)--.

Signed and Sealed this
Twenty-third Day of July, 2019

Andrei Iancu
*Director of the United States Patent and Trademark Office*